United States Patent
Onoyama et al.

(10) Patent No.: US 6,378,694 B1
(45) Date of Patent: Apr. 30, 2002

(54) CONVEYING APPARATUS

(75) Inventors: Tatsuo Onoyama, Kakogawa; Toshiyuki Sato, Takasago; Tadahiro Hayashida, Kakogawa, all of (JP)

(73) Assignee: Okura Yusoki Kabushi Kaisha (JP)

( * ) Notice: Subject to any disclaimer, the term of this patent is extended or adjusted under 35 U.S.C. 154(b) by 0 days.

(21) Appl. No.: 09/565,345

(22) Filed: May 5, 2000

(30) Foreign Application Priority Data

May 7, 1999 (JP) .......................................... 11-126991

(51) Int. Cl.⁷ .............................................. B65G 13/02
(52) U.S. Cl. .................................. 198/781.06; 198/788
(58) Field of Search ........................... 198/460.1, 788, 198/781.06

(56) References Cited

U.S. PATENT DOCUMENTS

| | | | | |
|---|---|---|---|---|
| 3,960,262 A | * | 6/1976 | Henig ................. | 198/781.06 X |
| 4,453,627 A | * | 6/1984 | Wilkins .................. | 198/781.06 |
| 4,609,098 A | * | 9/1986 | Morgan et al. ......... | 198/781.06 |
| 4,921,092 A | * | 5/1990 | Crawford et al. ......... | 198/460.1 |
| 5,070,995 A | * | 12/1991 | Schaffer et al. ........... | 198/460.1 |
| 5,228,558 A | * | 7/1993 | Hall ........................... | 198/784 |
| 5,285,887 A | * | 2/1994 | Hall ......................... | 198/460.1 |
| 5,456,347 A | * | 10/1995 | Best et al. .............. | 198/781.06 |
| 5,862,907 A | * | 1/1999 | Taylor ............... | 198/781.06 X |
| 6,021,888 A | * | 2/2000 | Itoh et al. ........... | 198/781.06 X |
| 6,035,999 A | * | 4/2000 | Hall ....................... | 198/781.06 |
| 6,244,421 B1 | * | 6/2001 | Hall ......................... | 198/460.1 |
| 6,253,906 B1 | * | 7/2001 | Hall ......................... | 198/460.1 |

* cited by examiner

Primary Examiner—Stephen T. Gordon
Assistant Examiner—Patricia Engle
(74) Attorney, Agent, or Firm—Morrison Law Firm

(57) ABSTRACT

A rotation detection device is provided in a motor roller of a conveying apparatus to detect changes in the rotation speed of the motor roller. When an object is moved from an upstream location of a conveyance path to the motor roller having the rotation detection device, the rotation detection device detects the presence of the object by measuring the slight variation in rotation speed of the motor roller. A control unit is provided to monitor the output signals from a plurality of rotation detection devices, arranged along the conveyance path. The control device independently adjusts the conveyance speeds of a plurality of independent conveyance portions along the conveyance path based upon these output signals. This system allows conveyance of a plurality of objects along the conveyance while avoiding one object from running into another object due to, for example, a delay at a particular point along the conveyance path.

15 Claims, 9 Drawing Sheets

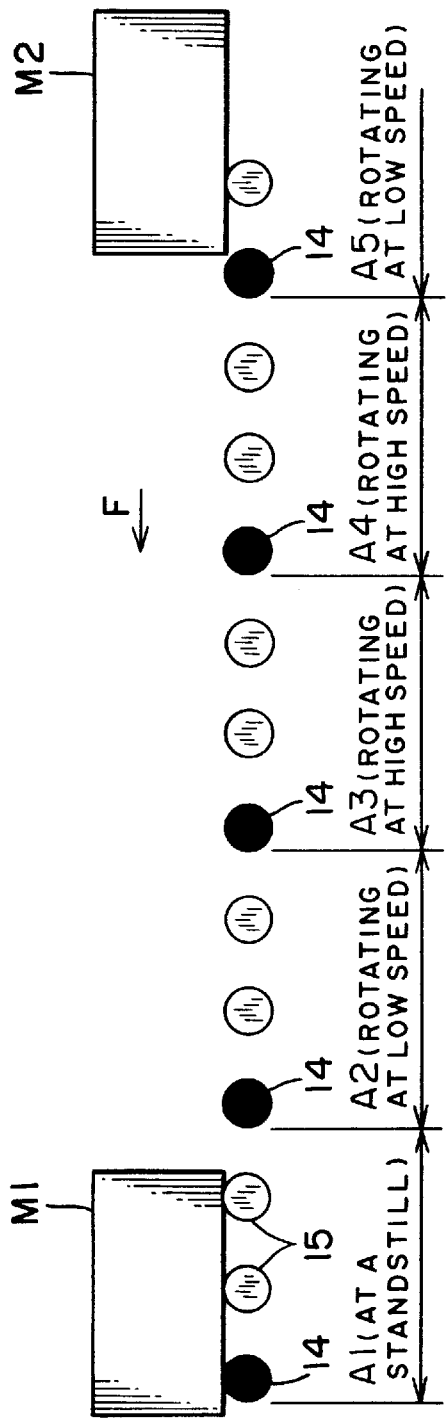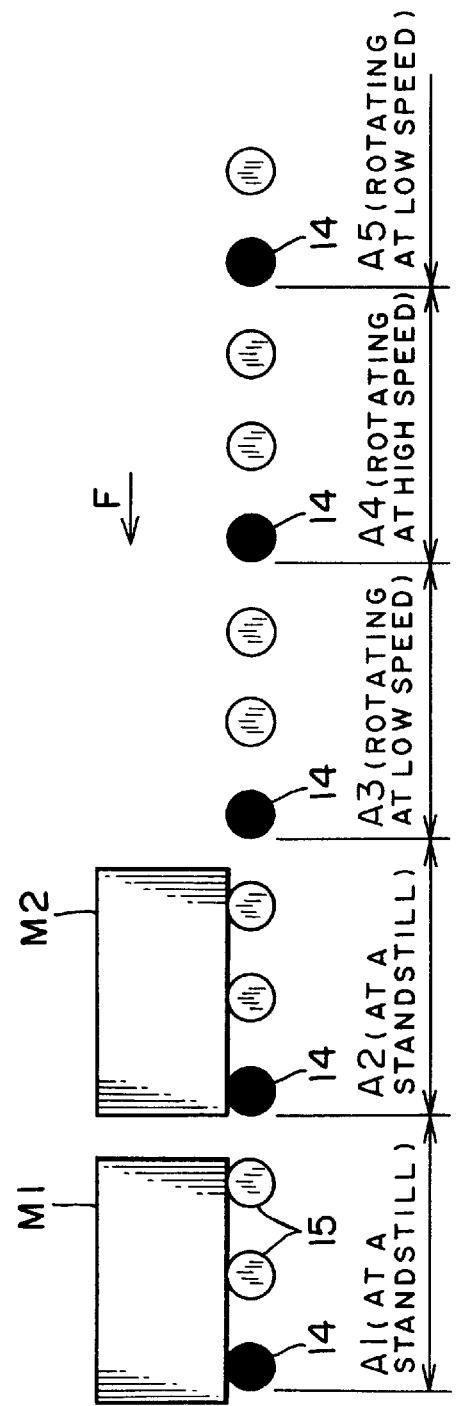

CONVEYING APPARATUS

BACKGROUND OF THE INVENTION

The present invention relates to a conveying apparatus which uses motor rollers to convey and detect an object being conveyed.

Conventional conveying apparatuses, such as, for example, accumulating conveyors, have a structure such that the conveying area is divided into a plurality of sections along the conveying path. When an object is conveyed onto a conveying section in the situation where another object temporarily rests in the conveying section located downstream from the conveying section, the object in the upstream conveying section is paused. Once to object in the downstream conveying section is moved out, conveyance of the object in the upstream conveying section is resumes. Thus, a plurality of objects are conveyed in succession while being prevented from coming onto contact with one another.

In order to detect objects that are being conveyed, such a conveying apparatus typically includes a detecting means which may use a photoelectric switch or include a switch that can be turned on or off by a rotatable free roller which is being pushed down by the weight of an object. Other conventional conveying apparatus have a structure such that an encoder incorporated in a rotatable free roller is caused to output pulses by the free roller that turns in the manner of slave rotation when an object passes thereon.

In order to detect objects, however, conventional conveying apparatuses require a special detecting means that is provided separately from the conveying device. Providing such a separate detecting means increases the number of parts and complicates the structure.

OBJECTS AND SUMMARY OF THE INVENTION

It is an object of the present invention to provide a conveying apparatus which overcomes the problem.

It is a further object of the present invention is to provide a conveying apparatus which is capable of carrying and detecting objects while having a simple structure that does not necessitate a special detecting means, but merely uses motor rollers.

Briefly stated, the present invention provides a rotation detection device in a motor roller of a conveying apparatus to detect changes in the rotation speed of the motor roller. When an object is moved from an upstream location of a conveyance path to the motor roller having the rotation detection device, the rotation detection device detects the presence of the object by measuring the slight variation in rotation speed of the motor roller. A control unit is provided to monitor the output signals from a plurality of rotation detection devices, arranged along the conveyance path. The control device independently adjusts the conveyance speeds of a plurality of independent conveyance portions along the conveyance path based upon these output signals. This system allows conveyance of a plurality of objects along the conveyance while avoiding one object from running into another object due to, for example, a delay at a particular point along the conveyance path.

According to an embodiment of the present invention, there is provided a conveying apparatus, comprising: at least a first motor roller and a second motor roller; at least a first motor unit and a second motor unit; the first motor roller and the second motor roller each having a roller portion rotated by the first motor unit and the second motor unit, respectively; the first motor roller and the second motor roller providing conveying means for conveying an object along a conveyance path; a rotation detecting unit providing a rotation detection signal by detecting rotation of each of the roller portion; and control means for monitoring the rotation detection signal, thereby detecting a position of the object along the conveyance path.

According to another embodiment of the present invention, there is provided a conveying apparatus, comprising: a conveyance path; the conveyance path being divided into a plurality of independent conveying sections; conveyance means for moving objects along the conveyance path; detection means for detecting the presence of the object at one of the plurality of independent conveying sections of the conveyance path; control means for adjusting a speed of each of the plurality of independent conveying sections, whereby the objects are prevented from contacting each other; and the detection means includes measuring means for measuring the conveying speed of each of said plurality of independent conveying sections, thereby detecting a slight variation in the conveying speed when one of the objects moves into one of the plurality of independent conveying sections.

A conveying apparatus according to an embodiment of the present invention includes motor rollers, each of which is provided with a motor unit, a roller portion adapted to be rotated by said motor unit, and a rotation detecting unit for detecting rotation of the roller portion and outputting signals representing results of detection. A conveying device is adapted to carry objects by using the motor rollers. A control means is adapted to monitor detection signals output from the rotation detecting units of said motor rollers so as to detect objects based on changes in rotation of the roller portions.

With the configuration as above, the conveying apparatus makes use of the rotation detecting units that is incorporated in each motor roller for the purpose of control of its speed in such a way that the apparatus monitors detection signals output from the rotation detecting unit of the corresponding motor roller. These rotation detecting units detect an object based on change in rotation of the roller portion, which occurs when the object reaches the roller portion.

A conveying apparatus according to a feature of the present invention has the control means adapted to detect an object by monitoring detection signals output from the corresponding rotation detecting unit while rotating the corresponding motor roller at a constant speed.

As described above, the conveying apparatus detects an object by monitoring detection signals output from the corresponding rotation detecting unit while rotating the corresponding motor roller at a constant speed. Even if a reduction gear element is incorporated in each motor roller, arrival of an object causes change of rotation of the roller a portion more easily than when the motor roller is at a standstill. Therefore, the conveying apparatus ensures reliable detection of an object even if the object is light in weight.

A conveying apparatus according to another feature of the present invention has the control means adapted to detect an object by monitoring detection signals output from the corresponding rotation detecting unit while rotating the corresponding motor roller at a detection speed that is lower than a given conveying speed at which objects are conveyed.

When detecting an object, the conveying apparatus monitors detection signals output from the corresponding rotation detecting unit while rotating the motor roller at a detection speed that is lower than a given, conveying speed at which objects are conveyed. As a result of this feature, an object that has been conveyed at a given conveying speed easily changes rotation of a roller portion when the object reaches the roller portion. Therefore, the conveying apparatus ensures reliable detection of an object even if the object is light in weight.

A conveying apparatus according to a further feature of the present invention has a control means adapted to either increase the rotation speed of the corresponding motor roller up to the conveying speed, or stop its rotation, when the control means has detected an object.

By controlling a motor roller so as to either increase its rotation speed up to the conveying speed or stop its rotation upon detection of an object, the conveying apparatus either moves or stops the detected object.

A conveying apparatus according to another feature of the present invention is a conveying apparatus wherein the conveying device is provided with a plurality of conveying sections arranged along the conveying path along which objects are conveyed. Each conveying section has at least one motor roller. The control means of the apparatus is adapted to rotate the motor roller of a conveying section at the detection speed when an object rests in the conveying section that is located downstream from said conveying section. When another object is detected at the former conveying section, i.e. the upstream conveying section, the conveying apparatus temporarily stops the object in the upstream conveying section, and moves the object in the upstream conveying section after the object in the downstream conveying section is moved out of the downstream conveying section.

By thus rotating the motor roller of a conveying section at the detection speed when an object rests in the conveying section that is located downstream from the conveying section, and, when another object is detected at the upstream conveying section, temporarily stopping the object in the upstream conveying section, and moving the object in the upstream conveying section downstream after the object in the downstream conveying section is moved out of the downstream conveying section, the conveying apparatus performs accumulation of objects that are being conveyed.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2(*b*) is a side section of the conveying apparatus of FIG. 2(*a*).

FIG. 6(*b*) is a waveform chart of pulses output from the rotation detecting unit when the object reaches the motor roller.

FIGS. 7(*a*) and (*b*) are explanatory drawings for illustrating a procedure of accumulation according to an embodiment of the present invention.

DETAILED DESCRIPTION OF THE INVENTION

Figure 2A:
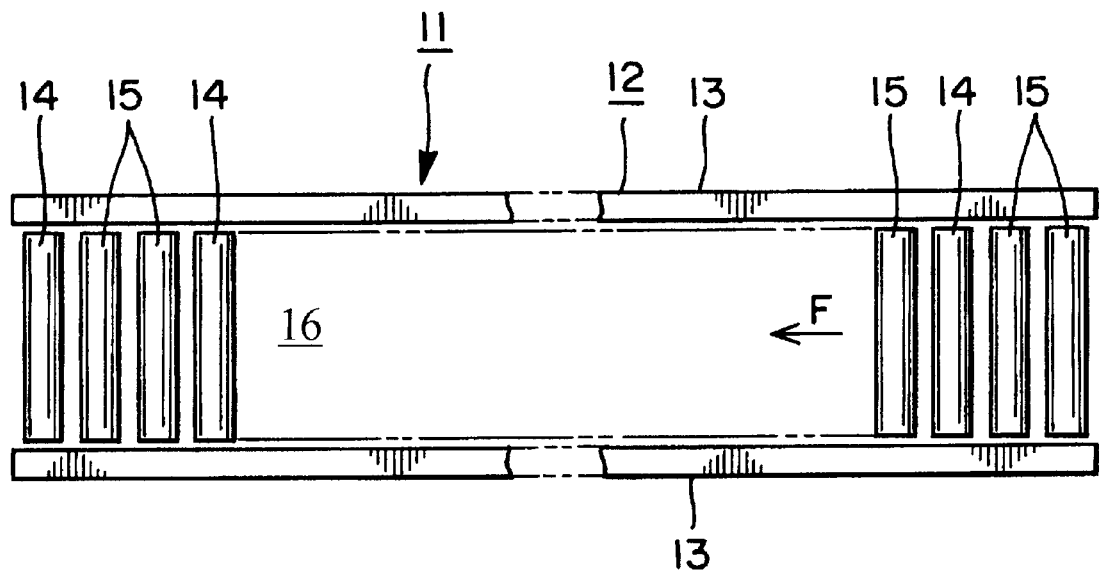
FIG. 2(*a*) is a top view of the conveying apparatus according to the present invention.
Figure 2B:
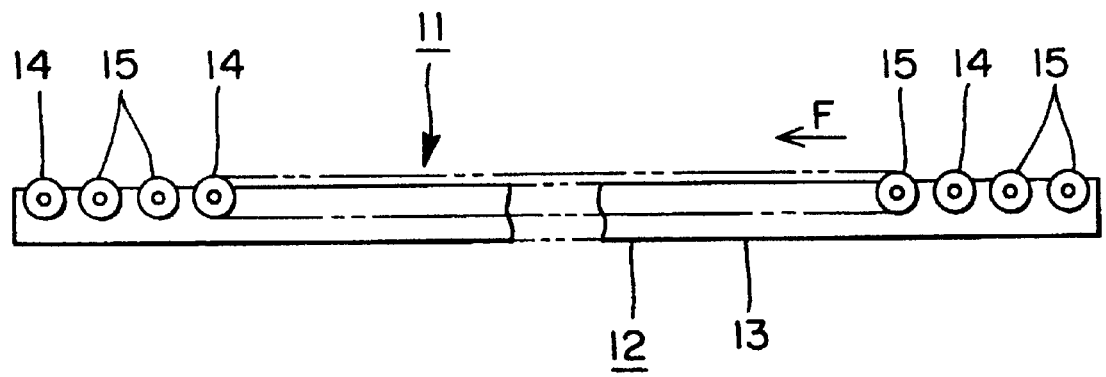

Referring to FIGS. 2(*a*) and 2(*b*), a roller conveyor type accumulating conveyor 11, serves as the conveying device to convey objects. A conveyor frame 12 includes a pair of side frames 13 and a plurality of laterally extending connecting members (not shown) for connecting side frames 13 to one another. Side frames 13 are parallel to each other and extend along the conveying path F along which objects are conveyed. Thus, side frames 13 form the two sides of conveying path F.

A plurality of motor rollers 14 and free rollers 15 are disposed between the two side frames 13 that form the two lateral sides of conveyor frame 12. Motor rollers 14 and free rollers 15 are arranged side by side along conveying path F to form a conveying surface 16 to carry objects.

Conveying surface 16 is divided into a plurality of conveying sections that are arranged side by side along conveying path F in such a manner that each conveying section is provided with at least one motor roller 14 and a plurality of free rollers 15 (two free rollers 15 in case of the present embodiment). In other words, a plurality of motor rollers 14 are arranged at a given pitch (at every third roller in case of the present embodiment), with a plurality of free rollers 15 (two free rollers 15 in case of the present embodiment) disposed between each motor roller 14 and its adjacent motor roller 14.

Figure 3:
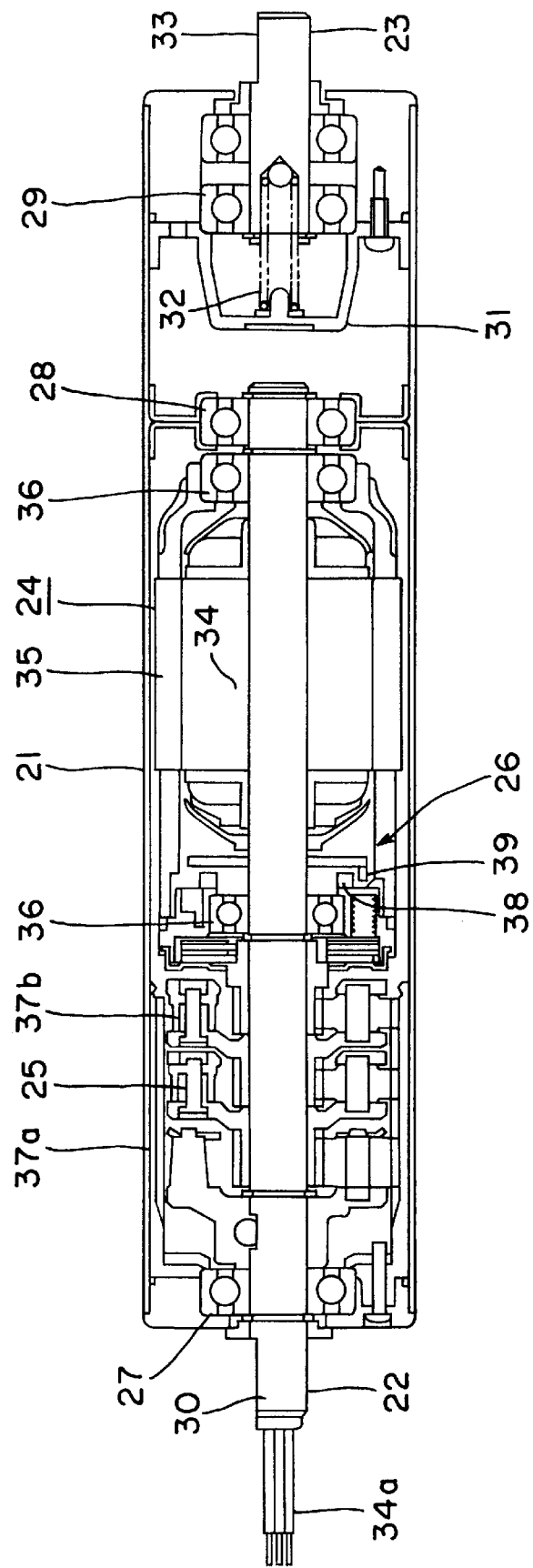
FIG. 3 is a sectional view of a motor roller of the conveying apparatus of the present invention.

Referring to FIG. 3, each motor roller 14 comprises a cylindrical roller portion 21, shaft portions 22 and 23, a motor unit 24, a reduction gear element 25 and a rotation detecting unit 26. Shaft portions 22 and 23 respectively project from the two opposing ends of the roller portion 21, supporting roller portion 21 in such a manner that roller portion 21 easily rotates around shaft portions 22 and 23. Motor unit 24 is disposed in roller portion 21 and attaches to one of the shaft portions, i.e. shaft portion 22. Reduction gear element 25 serves to transmit the rotational driving force of motor unit 24 to roller portion 21. Rotation detecting unit 26 is adapted to detect rotation of roller portion 21, in other words rotation of motor unit 24, and output signals representing results of detection.

Roller portion 21 is rotatably supported by shaft portion 22 at two locations, i.e. one of the two lateral ends of roller portion 21 and a location near the other end, with bearings 27 and 28 disposed between shaft portion 22 and the two locations. Roller portion 21 is also rotatably supported at the other end by means of the other shaft portion, i.e. shaft portion 23.

Shaft portions 22 and 23 are spaced apart and aligned along the axis of roller portion 21 in such a manner as to be coaxial with roller portion 21. Shaft portion 22 is a hollow cylinder defining a wiring space (not shown), which is adapted to contain a wiring. The end that projects from roller portion 21 has a mounting portion 30, at which shaft portion 22 is fastened to the adjacent side frame 13 so that shaft portion 22 is prevented from rotating. Shaft portion 23 is capable of sliding on a bearing 29 so as to move back and forth along the axial direction between the location where shaft portion 23 projects from the end of roller portion 21 and the location where the principal part of shaft portion 23 is inside roller portion 21. A spring 32, disposed between shaft portion 23 and a spring receiver 31, which is located closer to roller portion 21 than is shaft portion 23, constantly pushes shaft portion 23 so as to hold shaft portion 23 at the position where it projects from roller portion 21. The end of shaft portion 23 that projects from roller portion 21 has a mounting portion 33, at which shaft portion 23 is fastened to the adjacent side frame 13 so that shaft portion 23 is prevented from rotating. Motor roller 14 is easily mounted between the two side frames 13 by attaching the mounting portion of one of the shaft portions, e.g. mounting portion 30 of shaft portion 22, to one of the side frames 13 from inside, and, thereafter, bringing the other end of roller portion 21 into the interior of the other side frame 13 in the state where the other shaft portion 23 is retracted inside the roller portion 21, and then allowing the mounting portion 33 to project and connecting it to the side frame 13 from inside.

Motor unit 24 is preferably a dc motor having a stator 34, a cylindrical rotor 35 disposed around stator 34, and bearings 36. Stator 34 is disposed at the approximate center of roller portion 21 and affixed to shaft portion 22. Rotor 35 is rotatably supported at both ends by shaft portion 22, with a bearing 36 disposed between each end of rotor 35 and shaft portion 22. Stator 34 has a stator core and a stator winding. A lead wire 34a connected to the stator winding passes through the inside of shaft portion 22 and is drawn out of the shaft portion.

Reduction gear element 25 serves to reduce the torque of rotor 35 and transmits the reduced torque to roller portion 21. Reduction gear element 25, having an internal gear 37a and a planet gear mechanism 37b, has a structure such that the torque of rotor 35 is reduced and transmitted through planet gear mechanism 37b to internal gear 37a, which is attached to the inner cylindrical surface of roller portion 21.

Rotation detecting unit 26 is comprised of a hole sensor having a ring-shaped magnet 38 and a hole element 39 disposed near magnet 38. Magnet 38 is adapted to be coaxially mounted around rotor 35, while hole element 39 is attached to shaft portion 22 in such a manner as to face magnet 38. A lead wire, connecting to hole element 39 and passing through the inside of shaft portion 22, is drawn out of the shaft portion.

Figure 4:
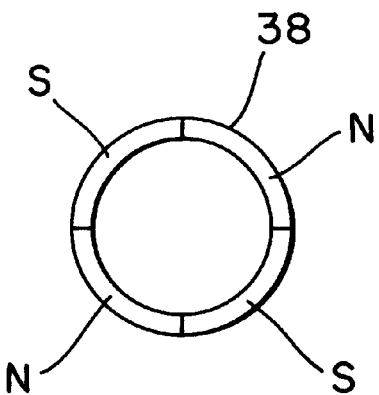
FIG. 4 is a side view of the magnet of the motor roller of FIG. 3.

Referring to FIG. 4, magnet 38 is polarized such that south poles and north poles are alternately arranged in a circle at 90° intervals.

Referring back to FIG. 3, rotation detecting unit 26 has a configuration such that one turn of rotor 35 causes two pulses to be output from hole element 39. In the case where reduction gear element 25 has a reduction ratio of, for example, 1/43, one turn of roller portion 21 causes hole element 39 to output 86 pulses.

Each free roller 15 is similar to each motor roller 14 in its outer shape. Each free roller 15 has a cylindrical roller portion and shaft portions that respectively project from the two opposing ends of the roller portion so as to support the roller portion. A bearing is positioned between each shaft portion and the roller portion in such a manner as to permit the roller portion to easily rotate.

Figure 1:
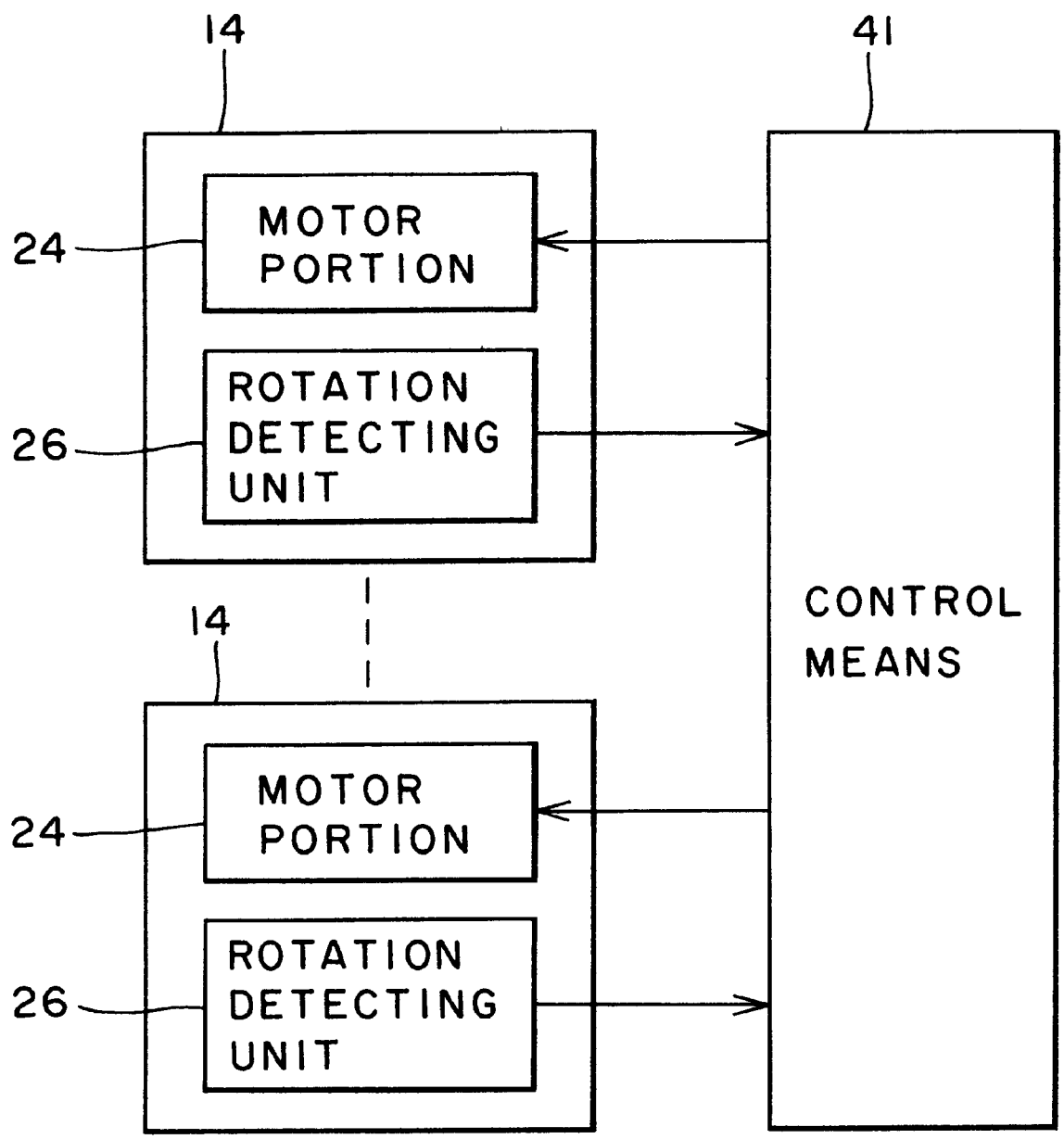
FIG. 1 is a system block diagram of a conveying apparatus according to an embodiment of the present invention.

Referring to FIG. 1, a control means 41 controls accumulation performed by accumulating conveyor 11. Control means 41 is adapted to adjust and control rotation speed of roller portion 21 by controlling the drive of motor unit 24 of each motor roller 14. Control means 41 receives detection signals output from rotation detecting unit 26 with rotation of motor unit 24.

Control means 41 has a function of monitoring detection signals output from rotation detecting unit 26 of each motor roller 14 and detecting a conveyed object based on changes in rotation, i.e. load changes, of roller portion 21. To be more specific, when detecting an object that is being conveyed, control means 41 monitors detection signals output from rotation detecting unit 26 while rotating motor roller 14 at a constant speed, i.e. at a detection speed that is lower than a given conveying speed (normal speed) at which an object or objects are carried. The aforementioned detection speed and conveying speed will hereinafter be referred to as the low speed and the high speed respectively. Other functions of control means 41 include an accumulation function for rotating motor roller 14 of a conveying section when objects on a conveying section located downstream from said conveying section are at a standstill, temporarily stopping the objects on the former conveying section, i.e. the conveying section at the upstream side, when such objects are detected, and moving the objects in the upstream conveying section at the high speed when said other objects are moved out of the downstream conveying section.

Figure 6A:
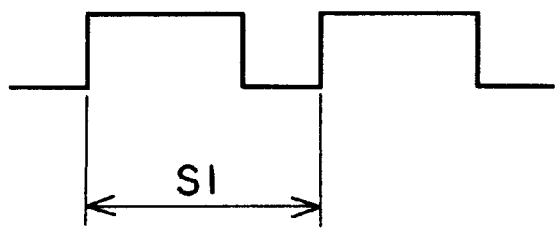
FIG. 6(*a*) is a waveform chart of pulses output from a rotation detecting unit before an object reaches a motor roller.
Figure 6B:
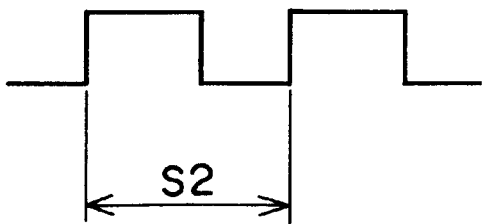
Figure 5:
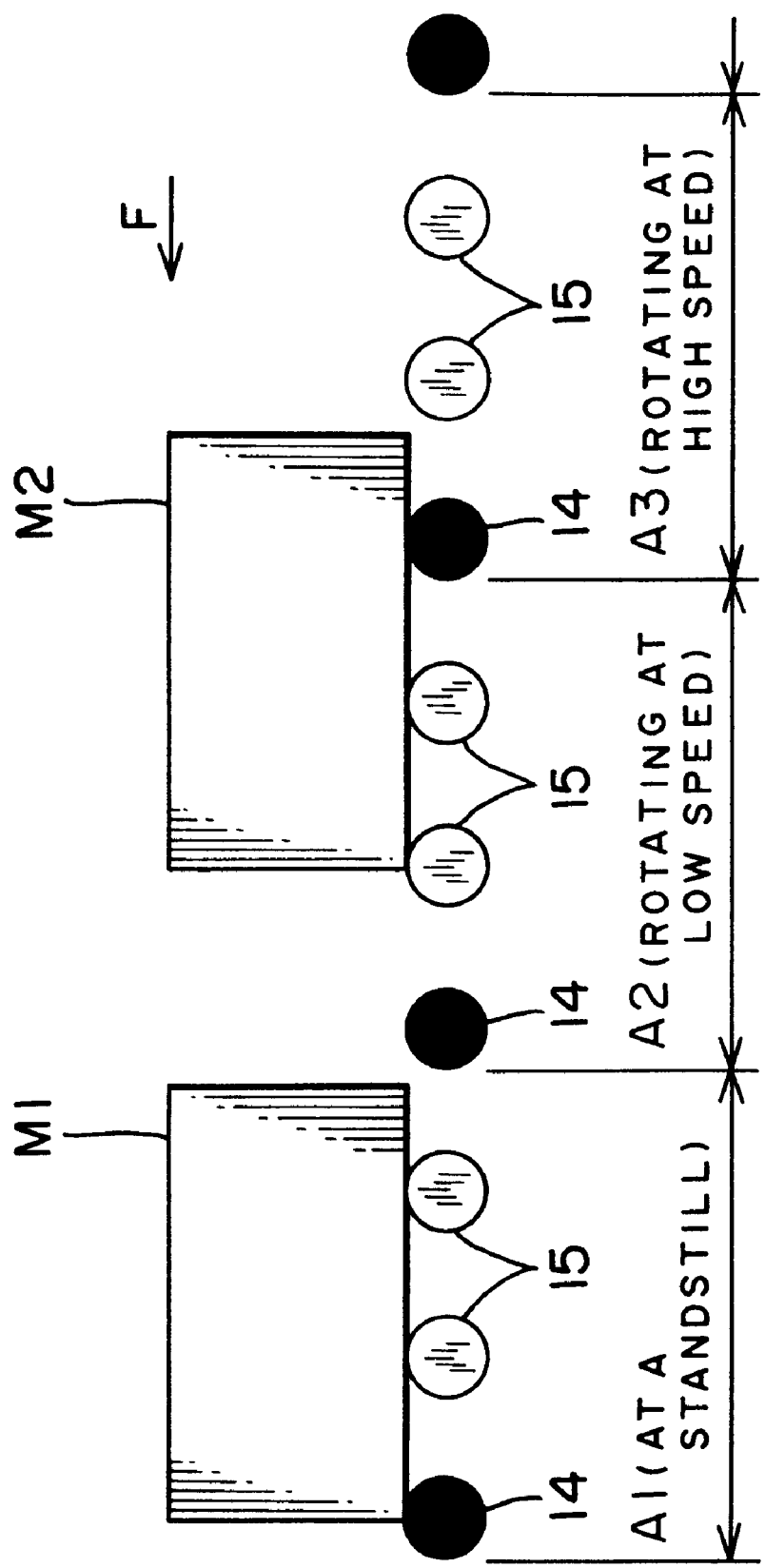
FIG. 5 is an explanatory drawing for explaining how the conveying apparatus of the present invention detects conveyed objects.

Referring to FIGS. 5, 6(a) and 6(b), motor roller 14 of a conveying section A1 is at a standstill so that an object M1 thereon is not moving. When detecting an object M2 that is being conveyed along conveying path F towards conveying section A2, located directly upstream from conveying section A1 in the state described above, control means 41 rotates motor roller 14 of conveying section A2 at the low speed. Throughout the period when motor roller 14 of conveying section A2 rotates at the low speed, rotation detecting unit 26 of motor roller 14 outputs pulses at given intervals S1, e.g. 42 msec., as shown in FIG. 6(a).

When motor roller 14 of conveying section A3 at the upstream side rotates at the high speed and moves object M2 rapidly toward conveying section A2, object M2 reaches conveying section A2 at a speed higher than the circumferential speed of motor roller 14 of conveying section A2, which is currently turning at the detection speed. Therefore, when object M2 comes into contact with motor roller 14 of conveying section A2, the rotation speed of motor roller 14 is temporarily increased. At that time, each interval S2, of the pulses output from rotation detecting unit 26 of motor roller 14 that is rotating at the low speed becomes shorter than the aforementioned pulse interval S1. For example, the pulse interval S2 may be 40 msec. in case of the present embodiment.

When generation of pulse interval S2 that is shorter than pulse interval S1 is detected, control means 41 judges that object M2 has reached conveying section A2 and accordingly halts the rotation of motor roller 14 of conveying section A2 in order to stop the movement of object M2.

As described above, an object is detected by monitoring detection signals output from rotation detecting unit 26 of the corresponding motor roller 14 in order to detect a rotational change that is to occur at roller portion 21 when the object reaches the roller portion. By thus using rotation detecting unit 26 incorporated in each motor roller 14 for the purpose of controlling its speed, the embodiment described above is capable of carrying and detecting objects while having a simple structure that does not necessitate a special detecting means, but rather merely requires use of motor rollers 14.

When detecting an object, this embodiment of the present invention calls for monitoring detection signals output from the corresponding rotation detecting unit 26 while rotating motor roller 14 at the detection speed that is lower than the conveying speed or the high speed, at which the object is conveyed. As it makes rotation of roller portion 21 easier to change when the object conveyed at the high speed reaches roller portion 21, this feature ensures the reliable detection even if the object to be detected is light in weight.

In case an object to be detected is light in weight, it is impossible to detect it while motor roller 14 is at a standstill. Since reduction gear element 15 is disposed between motor unit 24 and roller portion 21, a light object that has reached motor roller 14 merely slips on roller portion 21 instead of rotating the roller portion and, therefore, make its detection impossible. There may be various ways to allow roller portion 21 to rotate when an object reaches roller portion 21. For example, motor roller 14 may incorporate a clutch that is adapted to turn on or off the driving system of motor unit 24 and roller portion 21. However, inclusion of a clutch complicates both the structure and control of the apparatus and increases production costs. As a means to solve this problem, the present invention is adapted to detect an object by monitoring detection signals output from the corresponding rotation detecting unit 26 while rotating its motor roller 14 at the detection speed, which is lower than the high conveying speed at which the object is being conveyed. As it makes rotation of roller portion 21 easier to change when the object conveyed at the high speed reaches roller portion 21, it ensures the reliable detection even if the object to be detected is light in weight. In other words, by actively rotating roller portion 21, which is already rotating against dynamic friction instead of using static friction, the embodiment allows however small force of a lightweight object to easily change the rotation of roller portion 21, thereby ensuring the reliable detection of the object.

Next, the accumulation function of control means 41 is explained hereunder.

Referring to FIGS. 7(a) and 7(b), the process of accumulation is explained. As an example, reference is made to a case where accumulating conveyor 11 is provided with a plurality of conveying sections, for example conveying sections A1 through A5, which are arranged in the ascending order from the downstream side along conveying path F. During the time that the processing unit at the downstream side of accumulating conveyor 11 outputs accumulation command signals, motor roller 14 of conveying section A1 at the downstream-most side is at a standstill so that object M1, too, is paused. In this state, either all motor rollers 14 of conveying sections A2–A5 at the upstream side keep rotating at the low speed, or motor rollers 14 of conveying section A2 and conveying section A5, which is at the upstream-most side, are rotated at the low speed, while motor rollers 14 of conveying sections A3 and A4 are at a standstill.

When arrival of object M2 is detected at conveying section A5, located at the upstream-most side, motor rollers 14 of conveying sections A3 through A5 are rotated at the high speed to move object M2 downstream, while motor roller 14 of conveying section A2 is rotated at the low speed to prepare for arrival of object M2 (the state shown in FIG. 7(a)).

When arrival of object M2 is detected at conveying section A2, rotation of motor rollers 14 is halted to brake object M2, while motor rollers 14 of conveying section A3, which is located at the upstream side of conveying section A2, and conveying section A5 are rotated at the low speed to prepare for arrival of an object that will follow. This state is shown in FIG. 7(b). Meanwhile, motor roller 14 of conveying section A4 maintains its high-speed rotation. However, after the elapse of a given period of time, the rotation speed of motor roller 14 is reduced or halted.

By thus rotating motor roller 14 of the conveying section located immediately upstream from the conveying section on which an object rests, the conveyor of the present invention is prepares the upstream conveying section for arrival of a succeeding object. Upon arrival of the succeeding objects, the conveyor halts rotation of this motor roller 14 to stop the object. The apparatus according to this embodiment of the present invention makes a plurality of objects carried on accumulating conveyor 11 remain on the conveyor without bringing them into contact with one another.

Figure 8A:
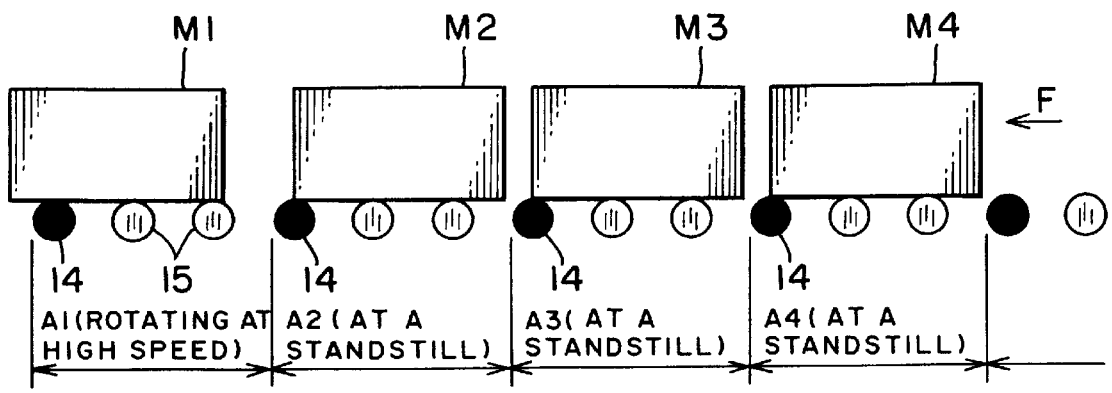
FIGS. 8(*a*), (*b*) and (*c*) are explanatory drawings for illustrating the procedure of start-up after accumulation is conducted as shown in FIG. 7.
Figure 8B:
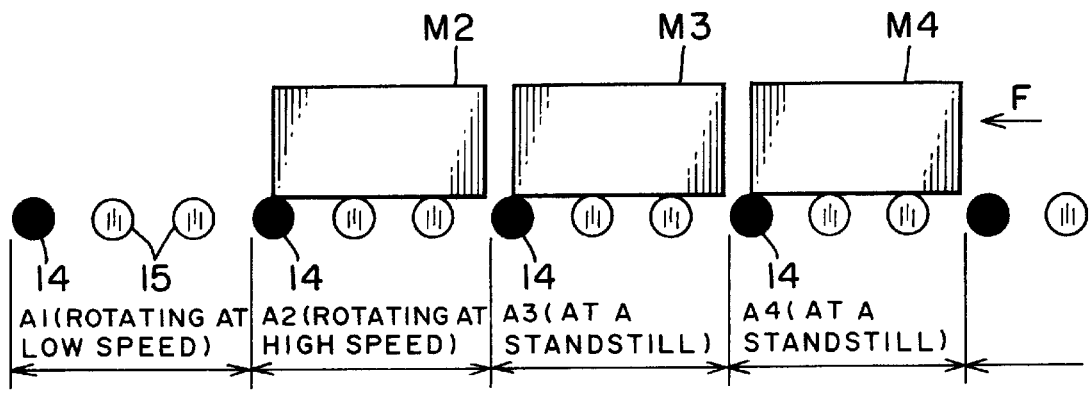
Figure 8C:
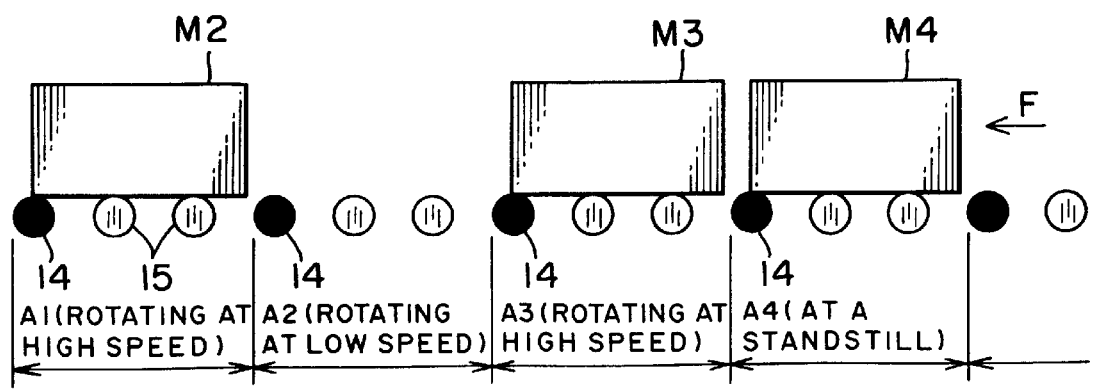

Referring to FIGS. 8(a), 8(b), and 8(c), the process of post-accumulation start-up is described. As an example, reference is made to a case where objects M1 through M4 rest in conveying sections A1 through A4, respectively, of accumulating conveyor 11. When the processing unit at the downstream side of accumulating conveyor 11 outputs clearing command signals in this situation, motor roller 14 of conveying section A1 at the downstream most side is rotated at the high speed so that object M1 in conveying section A1 moves downstream at the high speed and discharges out of the conveying section (the state shown in FIG. 8(a)).

When the processing unit at the downstream side of accumulating conveyor 11 detects object M1 that has been carried out of conveying section A1, the apparatus rotates motor roller 14 of conveying section A2 at the high speed. This carries object M2 in conveying section A2 downstream at the high speed and discharges it out of the conveying section, while rotating motor roller 14 of conveying section A1 at the low speed (the state shown in FIG. 8(b)).

In case the processing unit at the downstream side of accumulating conveyor 11 is outputting accumulation command signals, when the discharge of object M2 from conveying section A2 is detected at conveying section A1, motor roller 14 of conveying section A1 is halted so that object M2 comes to a standstill in conveying section A1. In case there is an outstanding clearing command signal, the apparatus rotates motor roller 14 of conveying section A1 at the high speed to move object M2 in conveying section A1 downstream at the high speed to discharge it out of the conveying section. Furthermore, the apparatus rotates motor roller 14 of conveying section A3 at the high speed, thereby carrying object M3 in conveying section A3 downstream at the high speed to discharge it out of conveying section A3 while rotating motor roller 14 of conveying section A2 at the low speed (the state shown in FIG. 8(c)).

As described above, when an object has been carried out of a conveying section, motor roller 14 of said conveying section is rotated at the low speed to prepare for arrival of another object from the upstream side. This occurs while motor roller 14 of the conveying section located upstream from said first conveying section is rotated at the high speed so that the object is carried downstream and moved out of the conveying section. The apparatus thus discharges a plurality of objects on accumulating conveyor 11 out of the conveyor without bringing them into contact with one another.

Next, the accumulation function of control means 41, according to another embodiment of the present invention, is explained.

Figure 9A:
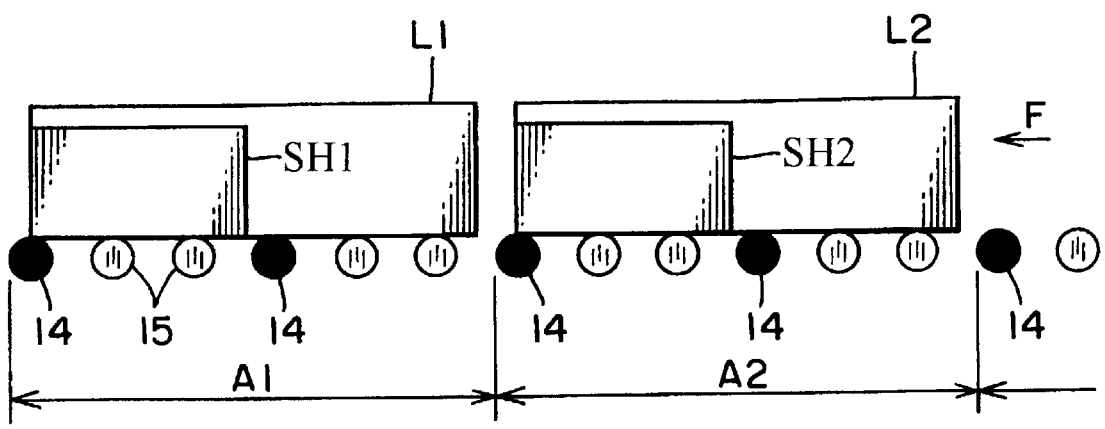
FIGS. 9(*a*), (*b*) and (*c*) are explanatory drawings for illustrating another procedure of accumulation according to an alternate embodiment of the present invention.
Figure 9B:
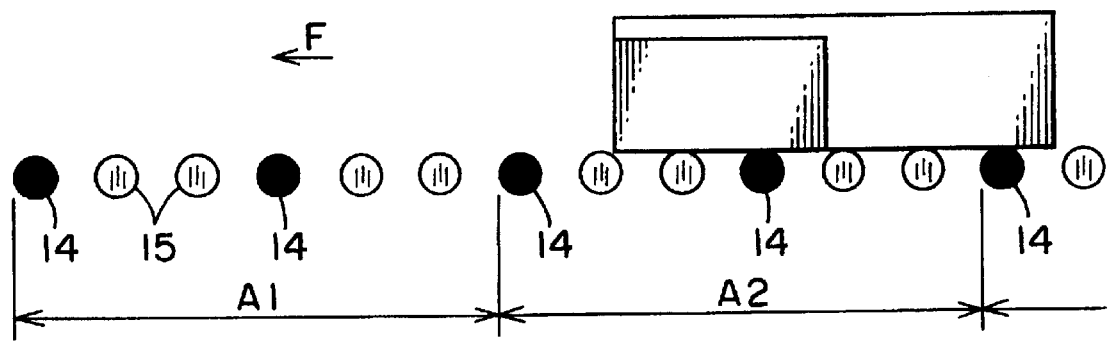
Figure 9C:
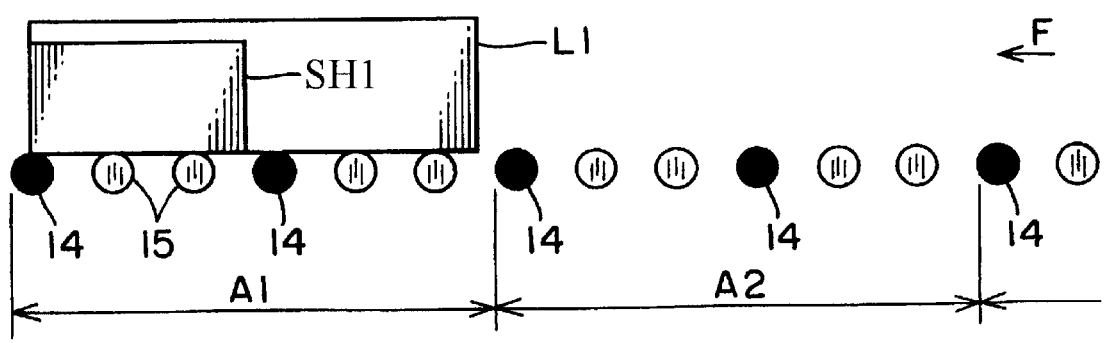

Referring to FIGS. 9(*a*), 9(*b*), and 9(*c*), when handling objects SH1 and SH2, which are shorter in the dimension parallel to conveying path F, or objects L1 and L2, which are longer in the dimension parallel to conveying path F, as shown in FIG. 9(*a*), the pitch (accumulation pitch) of each conveying section is set at a length greater than the maximum possible length of each object, and each conveying section A1 and A2 is provided with a plurality of motor rollers 14. In case of the present embodiment, each conveying section includes two motor rollers 14, of which the one at the downstream side serves as the master roller, while the one at the upstream side serves as the slave roller. Because of the slave motor, sufficient force for carrying an object is always ensured, even when handling shorter objects SH1 and SH2.

In case there is an accumulation command signal output to the downstream conveying section A1, the apparatus rotates motor roller 14 at the downstream portion of conveying section A1 at the low speed while rotating all motor rollers 14 located upstream from motor roller 14 of conveying section A1 at the high speed, thereby conveying an object SH1 or L1 downstream at the high speed (the state shown in FIG. 9(*b*)).

When the object SH1 or L1 reaches motor roller 14 at the downstream portion of conveying section A1 and is detected there, the apparatus halts rotation of all the motor rollers of conveying section A1 to brake object SH1 or L1 so that the object stops inside of conveying section A1. Furthermore, the apparatus rotates motor roller 14 at the downstream portion of conveying section A2, which is located immediately upstream from conveying section A1, at the low speed to get conveying section A2 ready for arrival of a succeeding object SH1 or L2 (the state shown in FIG. 9(C)).

As described above, the apparatus rotates, at the low speed, motor roller 14 at the downstream portion of the conveying section to which an accumulation command signal has been sent. The apparatus rotates, at the high speed, motor rollers 14 located upstream from the downstream motor roller 14, thereby getting them ready to receive a succeeding object. When an object arrives, all motor rollers 14 of the conveying section are halted so that a single object rests within a single conveying section. Thus, the apparatus according to this embodiment of the present invention makes objects that are of various types and lengths and are being carried on accumulating conveyor 11 remain on the conveyor without bringing them into contact with one another.

Figure 10A:
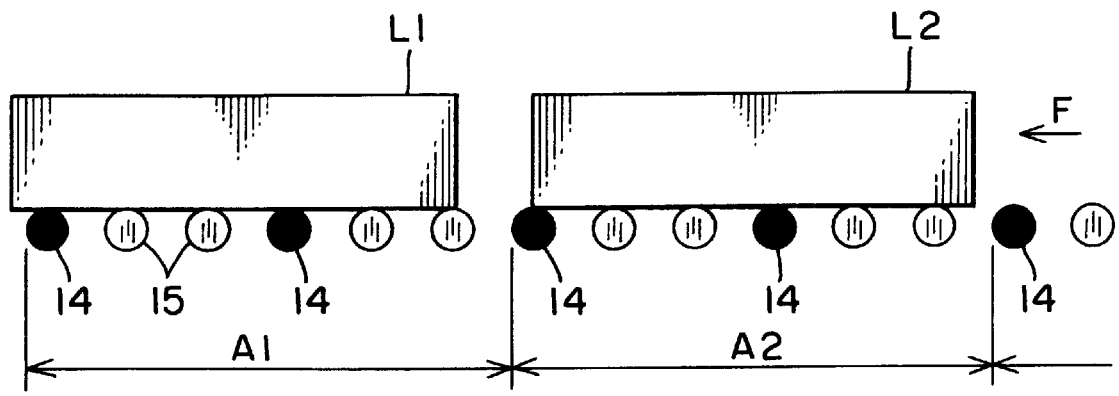
FIGS. 10(*a*) and (*b*) are explanatory drawings for illustrating the procedure of start-up after accumulation is conducted as shown in FIG. 9.
Figure 10B:
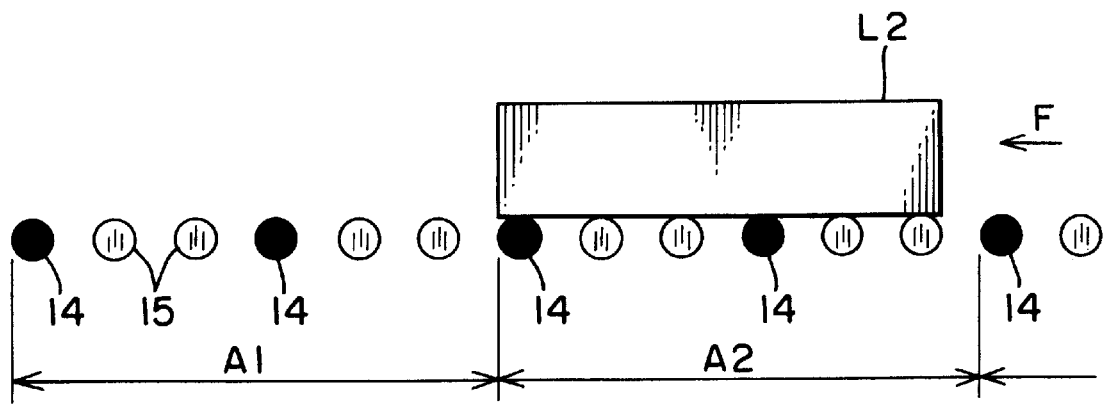

Referring now to FIG. 10, the process of post-accumulation start-up is described. As an example, reference is made to a case where objects L1 and L2 rest in conveying sections A1 and A2, respectively, of accumulating conveyor 11. When the processing unit at the downstream side of accumulating conveyor 11 outputs clearing command signals in this situation, all motor rollers 14 in conveying section A1, located at the downstream-most side, rotate at the high speed so that object L1 in conveying section A1 moves downstream at the high speed and is discharged out of the conveying section A1 (the state as shown in FIG. 10(*a*)).

When the processing unit at the downstream side of accumulating conveyor 11 detects object L1 has been carried out of conveying section A1, the apparatus rotates motor roller 14 in the upstream portion of conveying section A1 and all motor rollers 14 in conveying section A2 at the high speed, thereby carrying object L2 in conveying section A2 downstream at the high speed and discharging it out of the conveying section, while rotating motor roller 14 in the downstream portion of conveying section A1 at the low speed (the state shown in FIG. 10(*b*)).

In case the processing unit at the downstream side of accumulating conveyor 11 is outputting accumulation command signals when object L2 discharged from conveying section A2 is detected at conveying section A1, all motor rollers 14 in conveying section A1 are halted so that object L2 rests in conveying section A1. In case there is an outstanding clearing command signal, the apparatus rotates all motor rollers 14 in conveying section A1 at the high speed to move object L2, in conveying section A1, downstream at the high speed to discharge it out of the conveying section.

As described above, when object L1 has been carried out of a conveying section by means of high speed rotation of all motor rollers 14 in conveying section A1, the apparatus rotates motor roller 14 in the downstream portion of conveying section A1 at the low speed and rotate motor roller 14 in the upstream portion at the high speed, thereby getting conveying section A1 ready for arrival of object L2 from the upstream side. Meanwhile, all motor rollers 14 of conveying section A2, located upstream from conveying section A1, rotate at the high speed so that object L2 is carried downstream and moved out of the conveying section. The apparatus thus discharges objects of a plurality of types having different lengths on accumulating conveyor 11 out of the conveyor in succession without bringing them into contact with one another.

As described above, each motor roller 14 has the function of detecting an object, the function of carrying an object, and the function of stopping an object. Therefore, by merely using motor rollers 14, accumulating conveyor 11 has a simple structure.

When carrying a heavy object, it is not always necessary to rotate motor roller 14 intended for detection of arrival of the object at the detection speed that is lower than the conveying speed. Detection signals output from rotation detecting unit 26 may be monitored while motor roller 14 at the constant conveying speed. Even if motor roller 14 intended for detection of arrival of the object is at a standstill, an object can still be detected, provided that the object is heavy enough to rotate roller portion 21 upon its arrival.

Although arrival of an object is detected by use of motor roller 14 according to the embodiment described above, discharge of an object can be detected by using a structure that calls for monitoring detection signals output from the proper rotation detecting unit 26 while rotating the corresponding motor roller 14 at a constant conveying speed. To be more specific, when an object becomes detached from motor roller 14, the motor roller 14 is relieved of the load, and its rotation speed is momentarily increased. By watching for this change in rotation speed and making judgement based on this change, the apparatus is capable of detecting the discharge of the object.

Furthermore, the same effect and function is obtained by using an encoder as rotation detecting unit 26 of motor roller 14 instead of a hole sensor.

Using a dc motor for motor unit 24 of motor roller 14 ensures precise control of rotation speed and other characteristics. However, similar effect and function can be obtained by using an ac motor.

The conveying device used for the invention is not limited to a roller conveyor type accumulating conveyor the invention is also applicable to a belt conveyor type accumulating conveyor. In this case, the belt of each conveying section has to be rotated by at least one motor roller 14.

According to the structure of an embodiment of a conveying apparatus of the present invention, an object is detected by monitoring detection signals output from the rotation detecting unit of the corresponding motor roller in order to detect change in rotation of the roller portion. This change occurs when the object reaches the roller portion. By thus using a rotation detecting unit that is incorporated in each motor roller for the purpose of control of its speed, the conveying apparatus is capable of carrying and detecting objects while having a simple structure that does not necessitate a special detecting means but merely requires use of the motor rollers.

When detecting an object, a conveying apparatus according to the present invention monitors detection signals output from the corresponding rotation detecting unit while rotating the motor roller at a constant speed. As a result of this feature, even if a reduction gear element is incorporated in each motor roller, arrival of an object causes change of rotation of the roller portion more easily than when the motor roller is at a standstill. Therefore, the conveying apparatus ensures reliable detection of an object, even if the object is light in weight.

When detecting an object, a conveying apparatus, according to a feature of the present invention, monitors detection signals output from the corresponding rotation detecting unit while rotating the motor roller at a detection speed that is lower than a given conveying speed at which objects are conveyed. As a result of this feature, an object that has been conveyed at a given conveying speed easily changes rotation of a roller portion when the object reaches the roller portion. Therefore, the conveying apparatus of the present invention ensures reliable detection of an object even if the object is light in weight.

When the conveying apparatus has detected an object, the apparatus controls rotation of the corresponding motor roller so as to either increase its speed up to the conveying speed or stop its rotation. Therefore, the conveying apparatus ensures reliable control to move or stop objects during the process of their conveyance.

The conveying apparatus, according to another feature of the present invention, calls for rotating the motor roller of a conveying section at the detection speed when an object is at a standstill in the conveying section that is located downstream from said conveying section. When another object is detected at the upstream conveying section, the apparatus temporarily stops the object in the upstream conveying section, and moves the object in the upstream conveying section after the object in the downstream conveying section is moved out of the downstream conveying section. Therefore, the conveying apparatus ensures reliable accumulation of objects that are being conveyed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:
1. A conveying apparatus, comprising:
at least a first motor roller and a second motor roller;
at least a first motor unit and a second motor unit;
said first motor roller and said second motor roller each having a roller portion rotated by said first motor unit and said second motor unit, respectively;
said first motor roller and said second motor roller providing conveying means for conveying an object along a conveyance path;
a rotation detecting unit providing a rotation detection signal by detecting rotation of each of said roller portions;
control means for monitoring said rotation detection signal, hereby detecting a position of said object along said conveyance path.

2. The conveying apparatus according to claim 1, wherein:
said first motor roller and said second motor roller each independently rotate at a substantially constant speed;
said substantially constant speed being a detection speed when said rotation detecting unit is awaiting detection of said object; and
said substantially constant speed being a conveying speed when said rotation detection unit is conveying said object.

3. The conveying apparatus according to claim 2, wherein:
said detection speed is less than said conveying speed.

4. The conveying apparatus according to claim 3, wherein:
said detection speed is adjusted to one of said conveying speed and a stopped position when said object is detected by said control means.

5. The conveying apparatus according to claim 2, wherein:
said first motor roller being located downstream from and adjacent to said second motor roller in said conveyance path;
said control means rotates said second motor roller at said detection speed when said object is detected at said first motor roller;
said control means stopping rotation of said second motor roller when a second object is detected at said second motor roller and said object remains at said first motor roller, thereby preventing said object and said second object from contacting each other;
said control means resuming rotation of said second motor roller when said object is conveyed from said first motor roller along said conveyance path.

6. The conveying apparatus according to claim 5, wherein:
said detection speed is less than said conveying speed.

7. The conveying apparatus according to claim 5, wherein:
said detection speed is adjusted to one of said conveying speed and a stopped position when said object is detected by said control means.

8. A conveying apparatus, comprising:
a conveyance path;
said conveyance path being divided into a plurality of independent conveying sections;
conveyance means for moving objects along said conveyance path;
detection means for detecting the presence of said object at one of said plurality of independent conveying sections of said conveyance path;

control means for adjusting a speed of each of said plurality of independent conveying sections, whereby said objects are prevented from contacting each other; and said detection means includes measuring means for measuring said conveying speed of each of said plurality of independent conveying sections, thereby detecting a slight variation in said conveying speed when one of said objects moves into one of said plurality of independent conveying sections.

9. The conveying apparatus according to claim 8, wherein:

said plurality of independent conveying sections includes at least a first motor roller and a second motor roller and at least a first motor unit and a second motor unit;

said first motor roller and said second motor roller each having a roller portion rotated by said first motor unit and said second motor unit, respectively;

said first motor roller and said second motor roller providing said conveyance means for conveying an object along said conveyance path; and a rotation detecting unit providing said detection means by detecting rotation of each of said roller portion.

10. The conveying apparatus according to claim 8, wherein:

said first motor roller and said second motor roller each independently rotate at a substantially constant speed;

said substantially constant speed being a detection speed when said rotation detecting unit is awaiting detection of said object; and said substantially constant speed being a conveying speed when said rotation detection unit is conveying said object.

11. The conveying apparatus according to claim 10, wherein:

said detection speed is less than said conveying speed.

12. The conveying apparatus according to claim 11, wherein:

said detection speed is adjusted to one of said conveying speed and a stopped position when said object is detected by said control means.

13. The conveying apparatus according to claim 9, wherein:

said first motor roller being located downstream from and adjacent to said second motor roller in said conveyance path;

said control means rotates said second motor roller at said detection speed when said object is detected at said first motor roller;

said control means stopping rotation of said second motor roller when a second object is detected at said second motor roller and said object remains at said first motor roller, thereby preventing said object and said second object from contacting each other;

said control means resuming rotation of said second motor roller when said object is conveyed from said first motor roller along said conveyance path.

14. The conveying apparatus according to claim 13, wherein:

said detection speed is less than said conveying speed.

15. The conveying apparatus according to claim 13, wherein:

said detection speed is adjusted to one of said conveying speed and a stopped position when said object is detected by said control means.

* * * * *